Patented July 21, 1953

2,646,368

UNITED STATES PATENT OFFICE 2,646,368

WATER-REPELLENT NONFIBROUS CELLULOSIC MATERIAL AND PROCESS OF PREPARING SAME

William M. Wooding, Springdale, and Tzeng Jiueq Suen, Stamford, Conn., assignors to American Cyanamid Company, New York, N. Y., a corporation of Maine No Drawing. Continuation of abandoned application Serial No. 160,386, May 5, 1950. This application July 1, 1952, Serial No. 296,708

10 Claims. (Cl. 117—76)

This invention relates to a process of treating non-fibrous regenerated cellulosic materials with an aqueous solution of a water soluble thermosetting urea-formaldehyde resin modified by reaction with a compound having the general formula: $NH_2(CH_2)_nOSO_3X$ wherein $n$ is a whole number between 1 and 6 inclusive, and $X$ is a member of the group H, Li, Na, $NH_4$, and hydrogen in combination with a water soluble tertiary amine, for the purpose of improving the bonding of said cellulosic materials to subsequently applied water repellent topcoats. This invention further relates to a process of treating non-fibrous regenerated cellulosic materials with a water soluble modified urea-formaldehyde resin as defined hereinabove for the purpose of improving the water repellency of said cellulosic materials. This invention further relates to water repellent non-fibrous regenerated cellulosic materials bonded to a water repellent topcoat by use of a water soluble modified urea-formaldehyde resin as defined hereinabove.

One of the objects of the present invention is to produce a water repellent non-fibrous regenerated cellulosic material comprising a non-fibrous regenerated cellulosic material bonded to a water repellent topcoat by means of a water soluble modified urea-formaldehyde resin as identified hereinabove. A further object of the present invention is to produce a coated non-fibrous regenerated cellulosic material which is so securely bonded to said coating that it can withstand moist or wet conditions for prolonged periods of time without resulting in a separation of the cellulosic material from the water repellent topcoat. A further object of the present invention is to improve the water repellency of coated cellulosic materials, particularly cellulosic films, to such an extent that the use of said cellulosic materials can be extended considerably in their fields of application, whereby the utility of said non-fibrous regenerated cellulosic materials is greatly enhanced. These and other objects of the present invention will be discussed more fully hereinbelow.

In the practice of the process of the present invention, the treatment of the non-fibrous regenerated cellulosic materials can be accomplished in a number of different ways. For instance, one may immerse a wet, reswollen sheet of cellophane (a non-fibrous regenerated cellulosic material) in an aqueous solution of the modified urea-formaldehyde resin as defined hereinabove, whereby said film surface becomes impregnated with the resin solution. The film may then be withdrawn from the resin solution and treated with a plasticizing agent followed by a drying of the film, a partial curing of the resin impregnated into the film surface and the subsequent application of a water repellent coating to said film surface. A further variation of the basic process may be accomplished by incorporating the plasticizing agent into the aqueous resin solution whereby the impregnation and the plasticization of the film can be accomplished in a one step process. In this modification, the film would be removed from the resin plasticizing bath, dried, the impregnated resin partially cured and the topcoat bonded thereto. A still further modification of the basic process can be accomplished by spraying the resin solution on to the film, either in combination with or separately from the treatment with the plasticizer. In either event all other steps in the treatment of the film would be substantially the same.

The water soluble urea-formaldehyde resins modified by reaction with a compound having the general formula: $NH_2(CH_2)_nOSO_3X$, wherein $n$ is a whole number between 1 and 6, inclusive, and $X$ is a member of the group hydrogen, Li, Na, $NH_4$, and hydrogen in combination with a water soluble tertiary amine, used in the practice of the process of the present invention are fully disclosed in the copending application of one of the present applicants, namely T. J. Suen. That application carries the Serial No. 125,152 and was filed November 2, 1949. Therein, a complete disclosure of the method of preparing these modified urea-formaldehyde resins is set forth in great detail. In order that the present invention may be completely understood, however, the following discussion of these resins and method of preparation is set forth.

In the preparation of the urea resins used in the practice of the process of the present invention, one may combine urea and formaldehyde under alkaline conditions, as the first stage of the reaction, subsequently adding thereto an amino alkyl sulfuric acid and heating the reaction mixture at reflux temperatures, thereafter cooling the mixture under acid conditions and maintaining the mixture at comparatively low temperatures until the viscosity of a 45% solids solution of the reaction mixture in water is at least B on the Gardner-Holdt scale at 25° C. and preferably within the range of F-J on that scale. The process of preparing these resins may be modified in a number of different ways. For instance, the three reacting components may be introduced into a suitable reaction chamber and heated at elevated temperatures within the range of about 70°–90° C. under alkaline conditions, preferably at a pH of about 8–9 for a period of about 15–120 minutes. The reaction mixture may then be heated at reflux temperatures for a period of about 15–300 minutes and the pH of the reaction system at this temperature is not critical and need not be controlled on either the alkaline or the acid side. The pH of the reaction mixture may then be adjusted to about 1 to 5 but preferably 2 to 4 for a period of time sufficient to permit the reaction mixture to reach a viscosity of at least B on the Gardner-Holdt scale when the viscosity test is applied to a 45% solids solution of the resin in water at 25° C. This viscosity increase may be effected either by continued heating or cooling but preferably by cooling to a temperature of about 25–60° C. These and other modifications of the reaction process may be accomplished in the preparation of the resins per se. In order that the method of preparation of these resins which are used in the practice of the process of the present invention be more completely understood, the following detailed examples are set forth for the purpose of illustration only, and any specific enumeration of details should not be interpreted as a limitation on the case except as indicated in the appended claims.

RESIN A 60 parts of urea (1 mol), 178 parts of a 37% aqueous solution of formaldehyde (2.2 mols), and 0.66 part of 10% sodium hydroxide solution are introduced into a suitable reaction chamber to form a mixture with a pH of 9.5. The mixture is heated to a temperature of 70–80° C. and maintained at 70–80° C. for a 30 minute period, thereupon 8.4 parts (0.06 mol) of 2-aminoethylsulfuric acid dissolved in 13.8 parts of a 10% sodium hydroxide solution and 10 parts of water are introduced into the reaction system. The pH is then adjusted to about 2 with 10% hydrochloric acid and the reaction mixture is refluxed for 60 minutes. During the refluxing, the pH of the solution is adjusted to about 2.2 by the addition of 10% sodium hydroxide. The reaction mixture is then cooled to a temperature of about 40° to 45° C. and maintained at that temperature until the viscosity at 25° C. of a 45% solids solution of the reaction mixture in water is between I and J on the Gardner-Holdt scale. The resinous solution is then neutralized with 10% sodium hydroxide.

RESIN B 60 parts of urea and 203 parts of a 37% aqueous solution of formaldehyde and 0.66 part of a 10% solution of sodium hydroxide are introduced into a suitable reaction chamber and heated for a period of about 30 minutes at a temperature of about 70° to 80° C. The pH of the reaction mixture prior to the beginning of the exothermic reaction was about 9.4. Thereupon, 8.5 parts of 2-aminoethylsulfuric acid dissolved in 18.7 parts of a 10% aqueous solution of sodium hydroxide and 10 parts of water are then introduced and the pH of the reaction mixture is 5.6. The solution is heated at reflux temperature for approximately one hour at which time the pH has dropped down to about 2.5. The reaction mixture is then cooled to about 25° C. and its pH adjusted to 2.1 with 10% hydrochloric acid and permitted to remain at 25° C. for about 75 minutes. A 45% solids solution of the resin in water has a viscosity, at 25° C. of about H on the Gardner-Holdt scale. The resinous solution may then be neutralized with 10% sodium hydroxide.

RESIN C 60 parts of urea, 186 parts of a 37% aqueous formaldehyde solution, and 0.66 part of a 10% aqueous solution of sodium hydroxide are introduced into a suitable reaction chamber. The pH of the mixture is 9.4. The reaction mixture is heated to 70–80° C. for a 30 minute period. 8.5 parts of 2-aminoethylsulfuric acid dissolved in 18.7 parts of 10% sodium hydroxide solution and 10 parts of water are then introduced into the reaction mixture and the pH then is about 5.7. The reaction mixture is heated to reflux (about 96° C.) for a 60 minute period during which time the pH drops to about 2.5. The reaction mixture is then cooled to 45° C. and maintained at that temperature for about 25 minutes, whereupon the final viscosity, at 25° C., of a 45% solids solution of the resin in water is about D on the Gardner-Holdt scale. The pH of the resin syrup is then neutralized.

RESIN D 60 parts of urea, 162 parts of a 37% aqueous formaldehyde solution and 0.66 part of a 10% sodium hydroxide solution are introduced into a suitable reaction chamber to form a mixture with a pH at 9.6. The mixture is heated to and maintained for 30 minutes at a temperature of about 70–80° C. 8.5 parts of 2-aminoethylsulfuric acid dissolved in 19.8 parts of a 10% sodium hydroxide solution and 10 parts of water are then introduced into the system. The pH is adjusted to 5.9 and the mixture is heated to reflux (97° C.) for a 60 minute period. The final pH is about 2.6 and the mixture is cooled to a temperature of about 25° C. and maintained at that temperature for about 18 minutes. The viscosity, at 25° C., of a 45% resin solids solution in water is about H on the Gardner-Holdt scale. It is then neutralized with dilute sodium hydroxide.

RESIN E 50 parts of urea (1 mol) and 178 parts of a 37% aqueous formaldehyde solution are introduced into a suitable reaction chamber and the pH of the mixture is adjusted to about 9.5 by the addition of 0.66 part of a 10% sodium hydroxide solution. The mixture is then heated to 70°–80° C. for a 30 minute period. 4.25 parts (0.03 mol) of 2-aminoethylsulfuric acid dissolved in 9.4 parts of a 10% aqueous solution of sodium hydroxide and 5 parts of water are then introduced into the reaction system. The pH is about 5.6. The reaction mixture is then heated at reflux temperature (96° C.) for approximately 60 minutes. The pH drops to about 2.5. The mixture is then cooled to a temperature at 40–45° C. and is maintained at that temperature for a period of about 11 minutes. It is then neutralized. The final viscosity at 25° C. of a 45% solids solution is about F–G on the Gardner-Holdt scale.

RESIN F 60 parts of urea and 178 parts of a 37% aqueous formaldehyde solution are introduced into a suitable reaction chamber and the pH of the mix is adjusted to 9.6 by the addition of 0.66 part of a 10% sodium hydroxide solution. The mixture is then heated for a 30 minute period at a temperature of 70° to 80° C. 12.8 parts of 2-aminoethylsulfuric acid (0.99 mol) dissolved in 25.5 parts of a 10% sodium hydroxide aqueous solution and 10 parts of water are then introduced into the reaction mixture. The pH is about 5.8. The mixture is heated at reflux temperature (97° C.) for about 60 minutes. The pH drops to about 2.5. While keeping the pH at this level, the reaction mixture is cooled to and maintained at about 50° C. for about 53 minutes. It is then neutralized. The final viscosity of a 45% solids resin solution at 25° C. is about F on the Gardner-Holdt scale.

RESIN G 60 parts of urea and 178 parts of a 37% aqueous formaldehyde solution are introduced into a suitable reaction vessel and the pH of the mixture is adjusted to about 9.6 by the addition of 0.66 part of a 10% sodium hydroxide solution. The mixture is then allowed to react at a temperature of about 70° to 80° C. for a 30 minute period. Thereupon, 17 parts of 2-aminoethylsulfuric acid (0.12 mol) dissolved in 25 parts of a 10% sodium hydroxide solution and 10 parts of water are introduced into the reaction mixture. The pH is about 5.2. The mixture is heated at reflux temperature (95° C.) for about 60 minutes. At the end of refluxing the pH of the mixture is 2.2. The mixture is then cooled to 50° C. and maintained at that temperature for 43 minutes. It is then neutralized with 15 parts of a 10% sodium hydroxide solution. The final viscosity of the resin is H on the Gardner-Holdt scale.

RESIN H 180 parts of urea (3 mols), 511 parts of a 37% aqueous formaldehyde solution (6.3 mols), 6 parts of triethanolamine, and a solution of 17 parts of 2-aminoethylsulfuric acid (0.12 mol) and 60 parts of water are mixed together in a suitable reaction chamber. The pH is measured at 8.3 (glass electrode). The solution is heated to reflux and maintained at that temperature for approximately 30 minutes. The pH is then lowered to 3.9 by the addition of about 10.5 parts of a 10% hydrochloric acid solution. The reaction mixture is again refluxed for about 30 minutes. The pH drops to 3.7. The solution is cooled to 60° C. and maintained at 57° to 60° C. for about 20 minutes. It is then neutralized with a 10% sodium hydroxide solution. The viscosity of a 45% resin solids solution at 25° C. is between G and H on the Gardner-Holdt scale.

RESIN I 240 parts of urea (4 mols) is dissolved in 648 parts of a 37% aqueous solution of formaldehyde (8 mols) and the pH is adjusted to 8.7 with triethanolamine. The reaction mixture is heated to reflux temperature and maintained at reflux for approximately 30 minutes. The reaction mixture is then cooled to 80° C. and a solution of 17 parts of 2-aminoethylsulfuric acid in 38 parts of a 10% caustic solution and 20 parts of water is added. The pH is then adjusted to 6.3 with 18% hydrochloric acid. The reaction mixture is brought to reflux again and maintained at that temperature for an additional 30 minutes. The pH is then readjusted to 3.9 with an 18% hydrochloric acid solution and the reaction mixture is then refluxed for an additional 15 minutes. The pH of the reaction mixture is then adjusted to about 7.5 with a 10% caustic solution and cooled. The viscosity of the resin syrup containing 45% solids is about F on the Gardner-Holdt scale.

It will be noted from the above examples that the process for the preparation of these resins is preferably carried out in three stages, namely the first stage in which the urea and formaldehyde are permitted to react under alkaline conditions by heating to a temperature of about 70° to 80° C. for a 30 minute period. Thereupon the amino alkyl sulfuric acid, dissolved in dilute alkaline solutions, is added and the mixture refluxed for about one hour. This second phase is, as a rule, continued under acid conditions and is generally referred to as the acid stage because the pH is controlled within the limits of about 1–5 and preferably between 2 and 4. The third stage is the ageing or thickening stage, which must be conducted under acid conditions and preferably within the pH range of 3 to 4. This third stage may be accomplished by cooling the reaction mixture at a temperature varying between about 25° and 60° C. for a sufficient period of time to give the desired viscosity to the resin solution. The time factor during this third stage is of no consequence, but the important thing to remember is that the viscosity be observed so closely that it is kept within the desired range.

The purpose in establishing 45% resin solids solution in water as the basis for viscosity determinations is purely an arbitrary criterion. Any other solids content could be used but it would necessitate applying viscosity limits differing from those set forth. The viscosity measurement as set forth on the established solids basis establishes a criterion whereby the degree of polymerization in the resin formation can be ascertained. In the use of these resin solutions, it is customary to use solids concentrations far below the 45% resin solids used as the viscosity criterion so that, as a consequence, it is necessary to dilute the resin solution to the desired range before application.

It has been set forth hereinabove that the modifier for the urea-formaldehyde resin should be an aminoalkylsulfuric acid or derivative thereof having the formula: $NH_2(CH_2)_nOSO_3X$, wherein the letter $n$ signifies a whole number between 1 and 6, inclusive, and X designates a radical selected from the group consisting of H, Na, K, Li, $NH_4$ and hydrogen in combination with a water soluble amino group, such as those derived from triethylamine, trimethylamine, triethanolamine, and the like. Amongst that group are such compounds as aminomethylsulfuric acid, 2-aminoethylsulfuric acid, 3-aminopropylsulfuric acid, 4-aminobutylsulfuric acid, 5-aminoamylsulfuric acid, and 6-aminohexylsulfuric acid and the salts thereof as indicated above. It is preferred that the amino group and the sulfuric acid or salt group be attached to the two end carbon atoms of the alkyl group. The proportions of aminoalkylsulfuric acid which may be used in the practice of the process of this invention may be varied within the limits of 0.015–0.25 mol of aminoalkylsulfuric acid per mol of urea.

The molar proportions of formaldehyde to urea in the preparation of the resins of the instant invention may be varied within the limits of 1.5:1 to 3:1 respectively, but it is preferred that those resins which have mol ratios of 1.8:1 and 2.5:1 be used respectively.

If it is desired to introduce the three reacting components initially into the reaction chamber in the range of proportions set forth hereinabove, one may adjust the pH of the mixture to the alkaline side and preferably within the range of 8–9. The mixture may be heated for a period of from 15 to 120 minutes at a temperature varying between 70° C. and 90° C. The subsequent heating at reflux temperatures may be accomplished in a period of 15 to 300 minutes. The pH of the reaction mixture, during this phase of reaction, is not critical and may be on either the acid or alkaline side. In the ageing or thickening stage, however, the pH must be controlled within the range of 1 to 5, with the range of 2 to 4 producing optimum results. The reaction mixture may be cooled to a temperature within the range of 25-60° C. and held within that range until the desired viscosity is reached.

The cellulosic films to be treated in accordance with the practice of the process of the present invention may be regenerated cellulose prepared from solutions of cellulose xanthate, cuproammonium cellulose, cellulose acetate, cellulose nitrate, and the like. The cellulosic films may also be of a cellulose ester or ether such as cellulose acetate, cellulose nitrate, ethyl cellulose, methyl cellulose or similar cellulosic material. The treated cellulosic body may be freshly prepared and still wet and in a swollen condition or it may have been previously prepared, dried, and stored but in the latter event, it may be immersed in water so as to render it wet and swollen prior to treatment, or the cellulosic body may be rendered wet and swollen by the simultaneous immersion in the aqueous resin dispersion while the impregnating step is being accomplished.

The coating compositions which may be bonded to the cellulosic film base may be any of the conventional coating compositions such as those containing, as the film forming constituents, compounds such as cellulose acetate, cellulose nitrate, ethyl cellulose, methyl cellulose, deacetylated chitin, rubber, chlorinated rubber, rubber hydrochloride, cyclocized rubber, synthetic rubbers of various types, methacrylate polymers and other conventional film forming materials. In order to enhance the water repellent effects of the topcoat material, one may use waxes such as paraffin wax, scale wax, beeswax, montan, carnauba, candelilea wax, which are incorporated into the coating compositions prior to application on the treated cellulosic film. Plasticizers, gums, pigments and the like, may also be added to the coating composition when and as desired.

In the practice of the process of the present invention, it is desired to incorporate a plasticizing agent into the film as one of the steps in the preparation of the final product. This step of introducing the plasticizing agent into the film may be accomplished prior to the resin impregnation step, simultaneously therewith or subsequent thereto. As a still further modification, it is possible to impregnate the film with the resin, dry the film and then introduce the plasticizing agent into the film prior to the step of the partial polymerization of the resin on the film and the final step of coating with the water repellent coating composition. Any of the conventional plasticizing agents may be used but it is generally preferred that one use glycerol in about an 8% aqueous solution as this plasticizing agent appears to be the best suited from the standpoint of effectiveness and economy.

In order to illustrate more completely, the process of the present invention, the following examples are set forth solely for the purpose of illustration and any recital of specific details should not be interpreted as limitations on the case except as indicated in the appended claims.

*Example 1*

A strip of wet, swollen regenerated cellulose is immersed in an aqueous solution of the urea-formaldehyde 2-aminoethylsulfuric acid resin, such as that prepared according to Resin A set forth hereinabove, containing 1% by weight of resin based on the total weight of the solution. The film is then removed from the resin solution and introduced into the plasticizing bath containing 8% glycerol in aqueous solution, removed therefrom, dried for 10 minutes at 200° F. and coated with a water repellent lacquer.

*Example 2*

The process according to Example 1 is repeated except that the plasticizing agent is incorporated into the resin dispersion and the cellulosic film is introduced therein and after removal therefrom is dried and the resin impregnated onto the surface of said film, is partially polymerized by heating for approximately 10 minutes at 200° F. The treated film is then coated with a water repellent lacquer.

*Example 3*

The process according to Example 1 is repeated except that the step of immersing the film in the plasticizing bath is accomplished prior to the immersion in the resin dispersion so that the film upon removal from the resin solution is dried for about 10 minutes at approximately 200° F. and coated with a water repellent lacquer.

In order to test the effectiveness of the bonding of the topcoat to the film base, a sloughing test was conducted in which the films were immersed in water at a temperature of about 180-190° F. These tests are continued until the water repellent topcoat shows signs of separating from the cellulosic film base. A film prepared according to Example 1 was allowed three days of natural ageing after preparation but prior to the test, the film prepared according to Example 3 was allowed a natural ageing time of ten days after preparation but prior to the hot slough test and a film prepared according to Example 3 was allowed to age for fifteen days before the test. The following chart is set forth for the purpose of showing the relative values of the bonding efficiency of the resins as contrasted with a blank specimen which had been treated in all respects in the same manner as Examples 1, 2 and 3 except that no resin anchoring agent was used on these blanks.

CHART I

| Treated Cellulosic Film Produced by— | Concentration of Resin in Solution | Natural Ageing Time in Days after Curing | Hot Slough Tests—Total Oven Curing Time (190° F.) in minutes | | |
|---|---|---|---|---|---|
| | | | 3 | 8 | 13 |
| | Percent | | | | |
| Example 1 | 1 | <1 | 8 | 16 | |
| Blank A | 0 | <1 | 1.5 | 2 | |
| Example 2 | 1 | 3 | 30 | 42 | 59 |
| Blank B | 0 | 5 | 1 | 1 | |
| Example 3 | 1 | 10 | 39 | 53 | 68 |
| Blank C | 0 | 14 | 1.5 | 1.5 | |
| Example 3 | 1 | 15 | 54 | | |

In the practice of the process of the present invention, it is not necessary to have very substantial amounts of the resin present in the solution. One may use as little as 0.01% and up to about 10% of resin by weight based on the total weight of the aqueous solution. It is preferred, however, to use between about 0.1% and 3% by weight of resin based on the total weight of the resin solution.

There are many advantages in the use of the resins of the present invention such as the light color as these resins are either virtually colorless or extremely light colored. A further advantage of the present process resides in the fact that the cellulosic films may be treated by these resins in either a neutral or slightly alkaline solution which is to be highly desired over the use of the resinous solutions which must be acidic. When resins are used that require acid pH's, it is almost invariably necessary to make use of a washing step in order to remove excess acid, which in turn avoids degradation of the cellulose. This washing step tends to reduce the efficiency of the bonding characteristic of the acid type resins and increases the cost of operation. A further advantage which the present process provides is the much higher bond strength which is accomplished by the use of these particular resins. Furthermore, these resins cure easily, thereby producing maximum bond strength with low temperature cures or short periods of natural ageing.

The following chart is set forth for the purpose of showing the bonding efficiency of these resins when lower concentrations of resin in aqueous solution are used. These films were prepared in a manner comparable to that set forth in Example 1 except that the resin solution contained only 0.1% by weight based on total solution weight of resin.

CHART II

| Treated Cellulosic Film Produced in accordance with Example 1 | Concentration of Resin in Solution | Natural Ageing Time in Days after Curing | Hot Slough Test—Total Oven Curing Time (190° F.) | |
|---|---|---|---|---|
| | | | 3 min. | 8 min. |
| | Percent | | | |
| A | 0.1 | <1 | 13 | 15 |
| B | 0.1 | 14 | 35 | 25 |
| C | 0.1 | 15 | >60 | |

This application is a continuation of our earlier filed application having the Serial No. 160,386 and filed May 5, 1950, now abandoned.

We claim:
1. A process for treating non-fibrous regenerated cellulosic films comprising the steps of impregnating the surface of said films with a water soluble urea-formaldehyde resin modified by reaction with a compound having the general formula: $NH_2(CH_2)_nOSO_3X$, wherein $n$ is a whole number between 1 and 6, inclusive, and X is a member of the group consisting of H, Li, Na, NH$_4$, K and hydrogen in combination with a water soluble tertiary amine, wherein the mol ratios of urea, formaldehyde and aforementioned compound are within the range 1:1.5:0.015 and 1:3.0:0.25, respectively, introducing a plasticizing agent into the film, drying the film, thereby partially polymerizing said resin and applying a water repellent coating thereto.

2. A process for treating non-fibrous regenerated cellulosic films comprising the steps of impregnating the surface of said films with a water soluble urea-formaldehyde resin modified by reaction with a compound having the general formula: $NH_2(CH_2)_nOSO_3X$ wherein $n$ is a whole number between 1 and 6, inclusive, and X is a member of the groups consisting of H, Li, Na, NH$_4$, K and hydrogen in combination with a water soluble tertiary amine, wherein the mol ratios of urea, formaldehyde and aforementioned compound are within the range 1:1.8:0.03 and 1:2.5:0.12, respectively, introducing a plasticizing agent into the film, drying the film, thereby partially polymerizing said resin and applying a water repellent coating thereto.

3. A process for treating non-fibrous regenerated cellulosic film comprising the steps of impregnating the surface of said film with a water soluble urea-formaldehyde resin modified by reaction with a compound having the general formula: $NH_2(CH_2)_nOSO_3X$, wherein $n$ is a whole number between 1 and 6, inclusive, and X is a member of the group consisting of H, Li, Na, NH$_4$, K and hydrogen in combination with a water soluble tertiary amine, wherein the mol ratios of urea, formaldehyde and aforementioned compound are within the range of 1:1.5:0.015 and 1:3.0:0.25, respectively, wherein said resin is in aqueous solution and contains 0.01%–10% by weight of resin based on the total weight of solution; introducing a plasticizing agent into the film, drying the film, thereby partially polymerizing said resin, and applying a water repellent coating thereto.

4. A process for treating non-fibrous regenerated cellulosic film comprising the steps of impregnating the surface of said film with a water soluble urea-formaldehyde resin modified by reaction with a compound having the general formula: $NH_2(CH_2)_nOSO_3X$, wherein $n$ is a whole number between 1 and 6, inclusive, and X is a member of the group consisting of H, Li, Na, NH$_4$, K and hydrogen in combination with a water soluble tertiary amine, wherein the mol ratios of urea, formaldehyde and aforementioned compound are within the range 1:1.8:0.03 and 1:2.5:0.12, respectively, introducing a plasticizing agent into the film, drying the film, thereby partially polymerizing said resin and applying a water repellent coating thereto wherein said resin is in an aqueous solution containing 0.1%–3% by weight of resin based on the total weight of solution.

5. A non-fibrous cellulosic film impregnated with a urea-formaldehyde resin modified by reaction with a compound of the general formula: $NH_2(CH_2)_nOSO_3X$, wherein $n$ is an integer between 1 and 6, inclusive, and X is a member of the group consisting of H, Li, Na, NH$_4$, K and hydrogen in combination with a water soluble tertiary amine, and a water repellent topcoat bonded thereto, and wherein the mol ratios of urea, formaldehyde and aforementioned compound are within the range 1:1.5:0.015 and 1:3.0:0.25, respectively.

6. A process for treating non-fibrous regenerated cellulosic films comprising the steps of impregnating the surface of said films with a water soluble urea-formaldehyde resin modified by reaction with a compound having the general formula: $NH_2(CH_2)_nOSO_3Na$, wherein $n$ is a whole number between 1 and 6, inclusive, wherein the mol ratios of urea, formaldehyde and the aforementioned compound are within the range 1:1.5:0.015 and 1:3.0:0.25, respectively, introducing a plasticizing agent into the film, drying the film, thereby partially polymerizing said resin and applying a water repellent coating thereto.

7. A process for treating non-fibrous regenerated cellulosic films comprising the steps of impregnating the surface of said films with a water soluble urea-formaldehyde resin modified by reaction with a compound having the general formula: $NH_2(CH_2)_nOSO_3Na$, wherein $n$ is a whole number between 1 and 6, inclusive, wherein the mol ratios of urea, formaldehyde and aforementioned compound are within the range 1:1.8:0.03 and 1:2.5:0.12, respectively, introducing a plasticizing agent into the film, drying the film, thereby partially polymerizing said resin and applying a water repellent coating thereto.

8. A process for treating non-fibrous regenerated cellulosic film comprising the steps of impregnating the surface of said film with a water soluble urea-formaldehyde resin modified by reaction with a compound having the general formula: $NH_2(CH_2)_nOSO_3Na$, wherein $n$ is a whole number between 1 and 6, inclusive, wherein the mol ratios of urea, formaldehyde and aforementioned compound are within the range of 1:1.5:0.015 and 1:3.0:0.25, respectively, wherein said resin is in aqueous solution and contains 0.01%–10% by weight of resin based on the total weight of solution; introducing a plasticizing agent into the film, drying the film, thereby partially polymerizing said resin, and applying a water repellent coating thereto.

9. A process for treating non-fibrous regenerated cellulosic film comprising the steps of impregnating the surface of said film with a water soluble urea-formaldehyde resin modified by reaction with a compound having the general formula: $NH_2(CH_2)_nOSO_3Na$, wherein $n$ is a whole number between 1 and 6, inclusive, and wherein the mol ratios of urea, formaldehyde and aforementioned compound are within the range 1:1.8:0.03 and 1:2.5:0.12, respectively, introducing a plasticizing agent into the film, drying the film, thereby partially polymerizing said resin and applying a water repellent coating thereto wherein said resin is in an aqueous solution containing 0.1%–3% by weight of resin based on the total weight of solution.

10. A non-fibrous cellulosic film impregnated with a urea-formaldehyde resin modified by reaction with a compound of the general formula: $NH_2(CH_2)_nOSO_3Na$, wherein $n$ is an integer between 1 and 6, inclusive, and a water repellent topcoat bonded thereto, and wherein the mol ratios of urea, formaldehyde and aforementioned compound are within the range 1:1.5:0.015 and 1:3.0:0.25, respectively.

WILLIAM M. WOODING.
TZENG JIUEQ SUEN.

References Cited in the file of this patent

UNITED STATES PATENTS

| Number | Name | Date |
|---|---|---|
| 2,389,416 | D'Alelio | Nov. 11, 1945 |

OTHER REFERENCES

Rollins, Journal of the American Chemical Society, vol. 60, pages 2312–14.